US008834246B1

(12) United States Patent
Bhartia

(10) Patent No.: US 8,834,246 B1
(45) Date of Patent: Sep. 16, 2014

(54) METHODS AND TECHNIQUES FOR INCORPORATING GAME PLAY IN A TOURNAMENT FORMAT TO DEVELOP THINKING SKILLS

(76) Inventor: Akhilesh Bhartia, New Delhi (IN)

( * ) Notice: Subject to any disclaimer, the term of this patent is extended or adjusted under 35 U.S.C. 154(b) by 142 days.

(21) Appl. No.: 12/467,128

(22) Filed: May 15, 2009

Related U.S. Application Data

(60) Provisional application No. 61/053,681, filed on May 16, 2008.

(51) Int. Cl.
*A63F 9/24* (2006.01)

(52) U.S. Cl.
USPC .................................................. 463/9

(58) Field of Classification Search
USPC .................................................. 463/9
See application file for complete search history.

(56) References Cited

U.S. PATENT DOCUMENTS

2002/0010026 A1* 1/2002 York ............................ 463/47
2008/0248848 A1* 10/2008 Rippy et al. .................. 463/9
2009/0149248 A1* 6/2009 Busey et al. .................. 463/29

OTHER PUBLICATIONS

Risk Rules of Play for Parker Brothers' Continental Game, 1963, Hasbro.*
Battlefield 2 wikipedia page as of Jun. 20, 2011.*
Risk Wikipedia page.*
Risk Wikipedia page (date not available).*

* cited by examiner

*Primary Examiner* — Bradley K Smith
(74) *Attorney, Agent, or Firm* — Pillsbury Winthrop Shaw Pittman LLP

(57) ABSTRACT

A method for developing thinking skills comprises directing participants to play one or more real time strategy games and then directing the participants to engage in discussions about the game and the decisions that were made during game play. The steps of playing the game and then discussing the gaming experience may be repeated in an iterative fashion. Larger objectives external and/or in addition to the in-game objectives may be laid out for the participants, so that the participants are competing and/or trying to achieve objectives beyond those inherent in the real time strategy game itself. Also, a real time strategy (RTS) game provides "game within a game" capabilities, such that the game terrain (e.g., a game board) is divided up into a finite number of fragments. Within each fragment, game play is in real-time. A game at the fragment level is called a "local" real time strategy game (Local RTS), and the game at the level that encompasses the entire game terrain is called a "global" real time strategy game (Global RTS). The end of the game is reached when the Global RTS game is finished, not when a Local RTS game is finished.

4 Claims, 2 Drawing Sheets

METHODS AND TECHNIQUES FOR INCORPORATING GAME PLAY IN A TOURNAMENT FORMAT TO DEVELOP THINKING SKILLS

CROSS-REFERENCE TO RELATED APPLICATIONS

The present application claims priority to U.S. Provisional Application Ser. No. 61/053,681, filed May 16, 2008, the contents of which are incorporated by reference herein in its entirety.

FIELD OF THE INVENTION

The present invention is related to real time strategy games, and more particularly, to tournament designs incorporating real time strategy games.

BACKGROUND OF THE INVENTION

Real time strategy games develop thinking skills because gaming is an object oriented pursuit, where a player's actions may or may not bring him closer to achieving the objectives. However, because each player is responsible for his own actions, there is no larger environment in which his actions are evaluated and assessed. While it is understood that real time strategy games (RTS games) have potential to develop problem solving skills, decision making skills, and other skills, simply playing RTS games does not guarantee the use and therefore development of these skills. For example, a player can find solutions to in-game challenges by trial-and-error, observing another player, or from an external source (e.g., the Internet or another friend) without applying the appropriate thinking skills.

Therefore, in order to realize the potential of RTS games to engage players to develop thinking skills, there is a need for a method to better leverage the real time strategy gaming medium to further develop the gamers' thinking skills.

SUMMARY OF THE INVENTION

According to one aspect of the present invention, a method for developing thinking skills comprises directing participants to play one or more real time strategy games and then directing the participants to engage in discussions about the game and the decisions that were made during game play. The steps of playing the game and then discussing the gaming experience may be repeated in an iterative fashion. Larger objectives external and/or in addition to the in-game objectives may be laid out for the participants, so that the participants are competing and/or trying to achieve objectives beyond those inherent in the real time strategy game itself. The larger objectives direct the participants to learn to learn from their in-game experiences, such as by directing the participants to discuss various aspects of the in-game experiences and to critique the discussions of other participants. A set of guidelines, or rules, may set out a basic framework in which the discussions take place to further the participants' absorption of learning and thinking skills.

According to another aspect of the present invention, a RTS game provides "game within a game" capabilities, such that the game terrain (e.g., a game board) is divided up into a finite number of fragments. Within each fragment, game play is in real-time. A game at the fragment level is called a "local" real time strategy game (Local RTS), and the game at the level that encompasses the entire game terrain is called a "global" real time strategy game (Global RTS). The end of the game is reached when the Global RTS game is finished, not when a Local RTS game is finished.

DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

Figure 1:
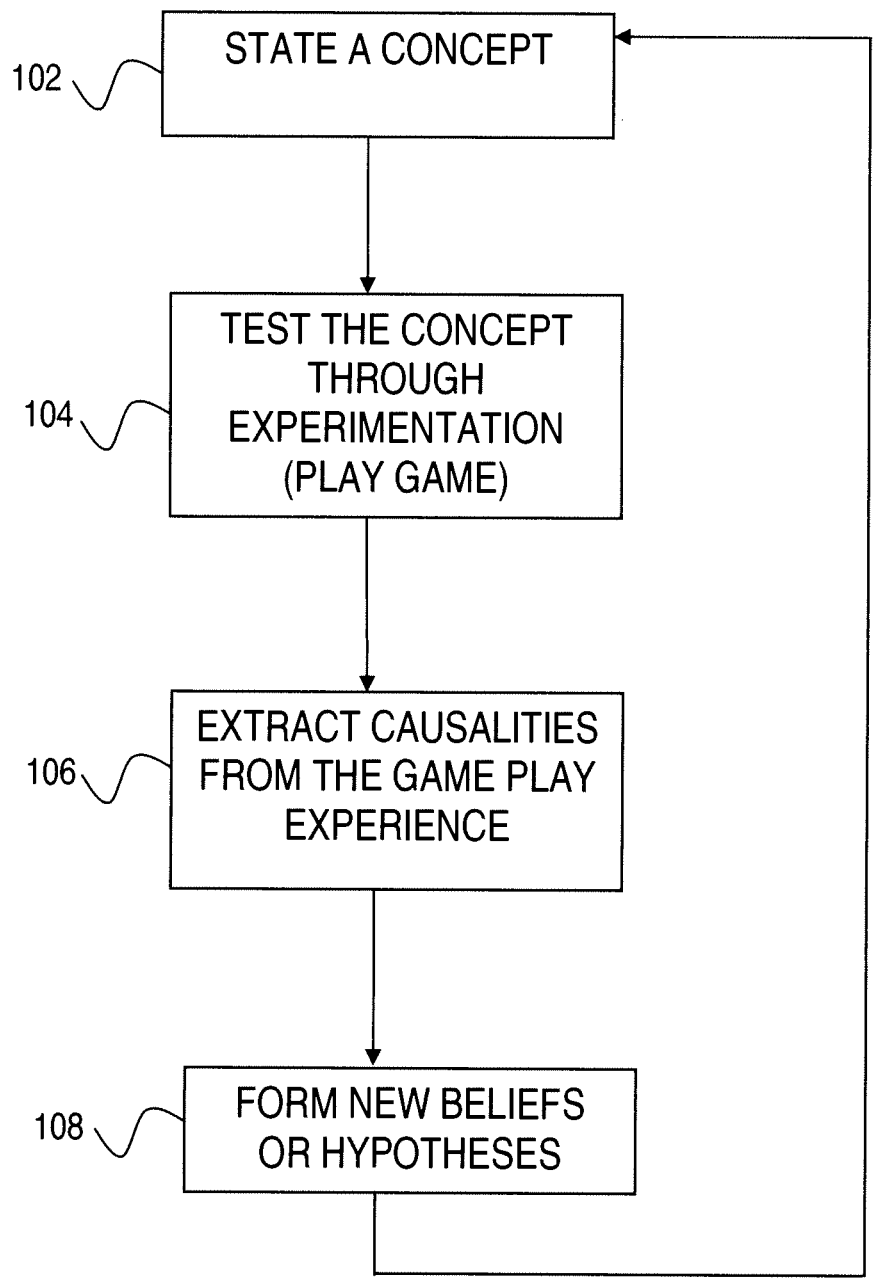
FIG. 1 depicts a flow chart 100 that illustrates an exemplary process of the present invention.

According to one aspect of the present invention, a method for developing thinking skills comprises directing participants to play one or more real time strategy games and then directing the participants to engage in discussions about the game and the decisions that were made during game play. The steps of playing the game and then discussing the gaming experience may be repeated in an iterative fashion. Larger objectives external and/or in addition to the in-game objectives may be laid out for the participants, so that the participants are competing and/or trying to achieve objectives beyond those inherent in the real time strategy game itself. The larger objectives direct the participants to learn to learn from their in-game experiences, such as by directing the participants to discuss various aspects of the in-game experiences and to critique the discussions of other participants. A set of guidelines, or rules, may set out a basic framework in which the discussions take place to further the participants' absorption of learning and thinking skills.

Participants are directed to play the RTS game and also compete on presenting the analyses of their in-game experiences. The presentation and discussion on analyzing in-game experiences further enhance the participants' thinking skills and the participants' in-game skills. Although the discussions take place with respect to the context of RTS games, the focus of the discussion remains on the sharpening of thinking skills.

In furtherance of this aspect of the present invention, the participants follow a cyclic process (flow chart 100 in FIG. 1) of: (1) stating a concept (step 102); (2) testing the concept through experimentation (e.g, by playing the RTS game) (step 104); (3) extracting causalities from the game play experience (e.g., by discussing the gaming experience with other participants) (step 106); and (4) forming new beliefs or hypotheses (step 108). This process may be repeated a number of times. The repeated cycles of this process may in turn be combined to form a tournament, in which each repeated cycle is a round in the tournament. The overall objective for the participants is to win or be in a team that wins the tournament. The tournament may therefore be thought of as the overall game, while the RTS games played by the participants are smaller "sub-games" whose results influence the overall result of the overarching tournament game.

According to one embodiment of the present invention, the winning criterion for winning the tournament is a combination of the game results (i.e., winning the games in the rounds) and the discussion results (i.e., winning the discussions in the rounds). During the competitive discussions, the participants are directed to analyze the previous gaming experience, identify points of inflection (a point of inflection is the point which the result for the game moves in favor of one of the sides), discuss and analyze the major decisions that were made in the game, extract causalities from the gaming experience, and critique the extracted causalities. The participants are judged based on these aspects of the discussions, as well as on the problem-solving skills, strategic thinking skills, and any other skills associated with the gaming experience manifested by the participants during the discussions. For example, geometry and trigonometry skills may be associated with a game based on World War II combat scenarios that involves the aiming of reticles.

The discussions may be held within a framework of guidelines, which sets out, for example, topics for discussions. The discussion may involve a participant or a team's analysis of the in-game experience as well as an opposing participant or an opposing team's critique of the presented analysis. The discussion may also involve an "anchor", who is a person who does not participate in the game or tournament, but possesses the appropriate reasoning and logical skills, and also knowledge of the tournament and guidelines, to direct the discussion into productive channels. As a result, a participant's analysis is conducted within a framework that is conducive to reflecting on and learning from the in-game experiences, where the analysis is also subject to critiques from other participants and/or anchor persons. Such discussions take place in a friendly, non-threatening atmosphere, and are directly pertinent to the participants' next round of game play, so the participants are encouraged to both analyze and share their thoughts as well as learn from the thoughts shared by others, resulting in an entertaining, fun, and productive learning experience for the participants.

It should be appreciated that while the discussions center around in-game experiences, the focus of the discussion remain on the thinking skills sought to be enhanced, such as decision-making and strategy-forming skills. Both the discussion framework and the participation of anchor persons in the discussions round assist in ensuring that the discussion, and hence the learning experience, is focused on the targeted skills.

In addition, discussion rounds may be "won" or "lost". While the determination of a winner or a winning team in the RTS game itself is straightforward, the determination of a winner or a winning team in the discussion rounds is more subjective, and may be made by the anchor person guiding the discussion rounds. The anchor person may, for example, select as the winning team the team that has made the most cogent analyses and critiques, has shown the most improvement in thinking skills, etc. The participants are aware that overall performance—the tournament results—is based on both in-game rounds and discussion rounds.

According to one embodiment, the process described in FIG. 1 is used to help participants develop leadership skills. In the "leadership track" of the process, participants are provided with experience in leading, decision-making, forming, communicating, and selling a visions, evaluating skills, assigning responsibilities, managing aspirations, developing and implementing strategies, handling a conflict, communicating effectively, and motivating other participants.

In a first stage of the leadership track, participants make decisions with perfect information. In the real time strategy game, the participants collect resources (game objects), invest the resources (e.g., exchange game objects for other game objects according to the rules of the game), and combine game objects in a way that results in new game units or game objects to appear in the game. In this game, the participants have perfect information, and the winning condition may be to remove the opponent from the game, or to eliminate a specific game object. This is a two-player game.

In a second stage of the leadership track, participants make decisions with imperfect information. As in the first stage, the participants play a real time strategy game where they collect resources (game objects), invest the resources (e.g., exchange game objects for other game objects according to the rules of the game), and combine game objects in a way that results in new game units or game objects to appear in the game. However, the information that is available to the participants is limited (e.g., only parts of a game terrain that is within a "line of sight" of the units controlled by a participant are visible to that participant). As in the first stage, the winning condition may be to remove the opponent from the game, or to eliminate a specific game object. This is a two-player game.

In a third stage of the leadership track, participants are introduced to leadership in a two-layer organization. As in the second stage, the participants play a real time strategy game where they collect resources (game objects), invest the resources (e.g., exchange game objects for other game objects according to the rules of the game), and combine game objects in a way that results in new game units or game objects to appear in the game. The information that is available to the participants is limited (e.g., only parts of a game terrain that is within a "line of sight" of the units controlled by a participant are visible to that participant). As in the first stage, the winning condition may be to remove the opponent from the game, or to eliminate a specific game object. In this stage, however, there are a minimum of two participants per side (i.e., a minimum of four players per game), and the participants are assigned different roles. When a participant is assigned the role of "leader", he has all game actions available to him. When a participant is assigned the role of "team member", he may only control an individual unit. In addition, while a "leader" participant may distribute and collect resources from "team members" and communicate in-game objects to "team members", a "team member" participant is limited to sharing information, messages, and resources with the leader. In addition, only the "leader" may invest the resources.

In a fourth stage of the leadership track, there are at least three participants on each side (i.e., a minimum of six participants in total). There are also three available roles: "leader", "team leader", and "teammates". The real time strategy game in the fourth stage also provides "game within a game" capabilities, such that the game terrain (e.g., a game board) is divided up into a finite number of fragments. Within each fragment, game play is the same as that in the third stage. A game at the fragment level is called a "local" real time strategy game (Local RTS), and the game at the level that encompasses the entire game terrain is called a "global" real time strategy game (Global RTS). The end of the game is reached when the Global RTS game is finished, not when a Local RTS game is finished. In addition, there may be rules that dictate how a side may reestablish presence within game terrain fragments that were previously lost. Rules also dictate the movement of game objects, units, and player control between the fragments.

In the game in the fourth stage, participants with different roles have different levels of control. For example, a "teammate" participant may control only a single or multiple units within a single game terrain fragment. A "team leader" participant, on the other hand, may be able to perform the functions described above with respect to a "leader" participant in the third stage, but only within one or more game terrain fragments. Finally, the "leader" participant may be able to perform the functions described above with respect to a "leader" participant in the third stage on a global scale (i.e., on the entirety of the game terrain).

The rules of the game may also dictate the relationships between the fragments, such as rules for the transfer of game objects (e.g., fragment 1 may only transfer objects to fragment 4, etc.).

In an exemplary embodiment, the first stage of the leadership track employs the "Command and Conquer Red Alert" game from Electronic Arts of Redwood City, Calif. The "Command Conquer Red Alert" game is an RTS. In this game, the game terrain and objects on the game terrain are visible to all players involved in the game once the game terrain has been explored by a player. The winning condition of the RTS game is elimination of all game objects and all units of the opposition.

In the start, single player competition may be conducted between experienced participants to determine who will be leaders. Inexperienced participants may be trained so that they become familiar with the game. Also, experienced participants may be paired with inexperienced participants so that the best participant is paired with the weakest participant, the second best participant is paired with the second weakest participants, and so on. Leaders may choose participants for their team by alternatively choosing pairs. Leaders are also directed to increase the overall performance of his team by motivating his team and to develop strategies with other participants on his team. Practice games and further training may continue until a set amount of time has elapsed and/or until the inexperienced participants become familiar with the game.

Subsequently, a mock tournament may be conducted, in which successive rounds of game play occur. In the game-playing rounds, the winning team is the team that wins the highest number of games within the round. During the game-playing rounds, the leaders may choose which of the pairs on the team should compete, and may also participate in motivating the playing pair(s). Motivation and guidance may also be provided by an anchor person.

In addition, the mock tournament includes discussion rounds, during which participants propose strategies for improved game play, identify the strengths and weaknesses of their strategy, and develop counter strategies to anticipate the strategies from the opposing side. Also, backup plans may be formulated, and points of inflection are identified and discussed. The anchor person may guide the participants in conducting analyses and steer the discussion rounds. Discussion rounds, like game play rounds, may also be won or lost.

A regular tournament may then be conducted after the mock tournament has familiarized the participants to the tournament format. In the regular tournaments, as in the mock tournament, there are both game-playing rounds and discussion rounds. For each round, whether game-playing or discussion, a team may be determined to be the winner. The team that wins the most number of rounds in the tournament is declared to be the overall tournament winner.

In an exemplary embodiment, the second stage of the leadership track employs the "Red Alert 2" game from Electronic Arts of Redwood City, Calif. "Red Alert 2" is a RTS game. The conduct of participants and the anchor person(s), as well as the framework of game-playing rounds and discussion rounds, in the second stage is substantially the same as that in the first stage. In the second stage, however, real time information is only available on the portions of the game terrain that is within the line of sight of player-controlled units. That is, participants who play the game have imperfect information.

In an exemplary embodiment, the third stage of the leadership track employs the "Battlezone 2" game from Activision of Santa Monica, Calif. "Battlezone 2" is a RTS game. The conduct of participants and the anchor person(s), as well as the framework of game-playing rounds and discussion rounds, in the second stage is substantially similar to that in the first stage. In the third stage, real time information is also only available on the portions of the game terrain that is within the line of sight of player-controlled units. That is, participants who play the game have imperfect information. However, the third stage is also different from the second stage in the following manners.

First, as discussed above, in the third stage, players may be assigned different roles (e.g., "leader" and "team member"), where player with "leader" roles have more control over in-game resources and possess the ability to direct player with "team member" roles. In the third stage, teams may be formed (e.g., three participants to a team). Leaders may be chosen based on observations from the practice games. The criteria for leadership may be based on a participant's confidence, spirit, personality, and/or gender. Leaders are directed to develop team strategies in collaboration with the rest of the team and to maintain motivation. A strategist may also be appointed for the team, as may be a group manager.

As in the first stage and the second stage, a mock tournament and then a regular tournament may be held. Also, within a tournament, whether mock or regular, both game-play rounds and discussions rounds are conducted, the results being tallied to determine an overall winning team for the tournament. In the third stage, however, participants are directed in the discussion rounds to focus more on skills related to the management and coordination of team members. To facilitate these discussions, participants may be asked to take notes about the communication skills and other skills exhibited by their team members throughout the course of the game-play rounds. Communication skills are a combination of the desire to communicate, knowing when to communicate, knowing what to communicate, and being precise in the communications. In addition, after every game played, the anchor person may debrief a team, where each team member can give an account of the game in private. During the debriefing session, the player may be asked to identify points of inflection, whether the team had started out with any general strategy, whether the general strategy was executed, and identify any teamwork related challenges.

The notes that are taken by the anchor person during debriefing sessions may later be used by the anchor person to track the progress of the participants and to ask participants questions that will assist in the participants' realization of their own weaknesses. Leaders may also be coached to improve leadership skills.

In an exemplary embodiment, the fourth stage of the leadership track, the conduct of participants and the anchor person(s), as well as the framework of game-playing rounds and discussion rounds is substantially similar to that in the third stage. In the fourth stage, real time information is also only available on the portions of the game terrain that is within the line of sight of player-controlled units. That is, participants who play the game have imperfect information. Moreover, as discussed above, the game terrain may be fragmented into different terrains, with a team leader for each game terrain fragment and a leader for the overall game terrain. In addition, the leader may assign and reassign roles such as "team leader" and "team member" to different participants.

According to another aspect of the present invention, a RTS game provides "game within a game" capabilities, such that the game terrain (e.g., a game board) is divided up into a finite number of fragments. Within each fragment, game play is in real-time. A game at the fragment level is called a "local" real time strategy game (Local RTS), and the game at the level that encompasses the entire game terrain is called a "global" real time strategy game (Global RTS). The end of the game is reached when the Global RTS game is finished, not when a Local RTS game is finished. In addition, there may be rules that dictate how a side may reestablish presence within game terrain fragments that were previously lost. Rules may also dictate the movement of game objects, units, and player control between the fragments.

Figure 2:
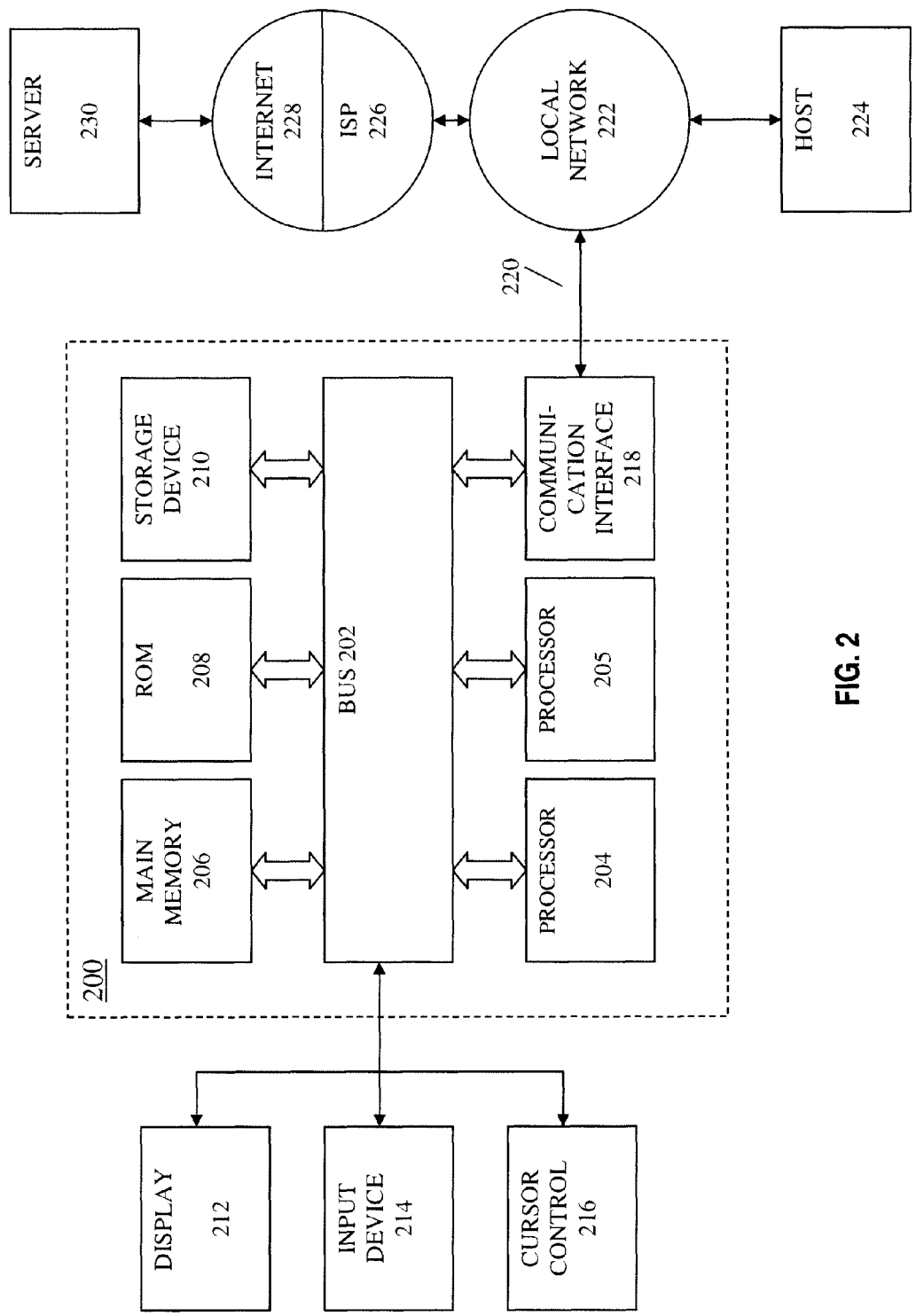
FIG. 2 is a block diagram illustrating an example computer system that can assist in implementing methods of the invention.

FIG. 2 is a block diagram that illustrates a computer system 200 which can assist in the providing a RTS that provides "game within a game" capabilities, according to the methods disclosed herein. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT) or flat panel or touch panel display for displaying information, such as visual information indicating an area or areas on the PCB that comprise optimal sense locations and locations that are optimal within a preset tolerance range, to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane. A touch panel (screen) display may also be used as an input device.

According to one embodiment of the invention, portions of the process for determining sense locations may be performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media and volatile media. Non-volatile media include, for example, optical or magnetic disks, such as storage device 210. Volatile media include dynamic memory, such as main memory 206. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 606 may optionally be stored on storage device 210 either before or after execution by processor 604.

Computer system 200 also preferably includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information. Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network, now commonly referred to as the "Internet" 228. Local network 222 and Internet 228 both use electrical, electromagnetic or optical signals that carry digital data streams.

Computer system 200 can send messages and receive data, including program code, through the network(s), network link 220, and communication interface 218. In the Internet example, a server 230 might transmit a requested code for an application program through Internet 228, ISP 226, local network 222 and communication interface 218. The received code may be executed by processor 204 as it is received, and/or stored in storage device 210, or other non-volatile storage for later execution.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer-implemented method of providing a real time strategy (RTS) game, comprising:
   providing a game terrain of the RTS game using one or more computer systems, the game terrain being divided into two or fragments; and
   managing, using the one or more computer systems, a RTS game playing experience for at least three players using the game terrain of the RTS game,
   wherein managing includes:
   a first player of the RTS game is provided with control over a particular fragment of the two or more fragments of the game terrain;
   a second player of the RTS game is provided with control only over the particular fragment the second player's control of the particular fragment being less than the first player's control; and
   a third player of the RTS game is provided with control only within the particular fragment, the third player's control being less than the second player's control.

2. The method of claim 1, wherein the first player is also provided control over one or more other of the two or more fragments of the game terrain.

3. A non-transitory computer-readable medium having computer-executable instructions for performing a method of providing a real time strategy (RTS) game, the computer-executable instructions comprising instructions which, when executed by one or more computer systems, cause the one or more computer systems to perform a method including:
   providing a game terrain of the RTS game using the one or more computer systems, the game terrain being divided into two or fragments; and
   managing, using the one or more computer systems, a RTS game playing experience for at least three players using the game terrain of the RTS game,
   wherein managing includes:
   a first player of the RTS game is provided with control over a particular fragment of the two or more fragments of the game terrain;
   a second player of the RTS game is provided with control only over the particular fragment the second player's control of the particular fragment being less than the first player's control; and
   a third player of the RTS game is provided with control only within the particular fragment, the third player's control being less than the second player's control.

4. The method of claim 3, wherein the first player is also provided control over one or more other of the two or more fragments of the game terrain.

* * * * *